United States Patent [19]

Storm

[11] Patent Number: 4,619,585
[45] Date of Patent: Oct. 28, 1986

[54] WIND TURBINE APPARATUS

[76] Inventor: Joe Storm, 1105 W. Elna Rae, Tempe, Ariz. 85281

[21] Appl. No.: 779,271

[22] Filed: Sep. 23, 1985

Related U.S. Application Data

[62] Division of Ser. No. 518,047, Jul. 28, 1983, Pat. No. 4,545,729.

[51] Int. Cl.[4] ............................................. F03D 3/06
[52] U.S. Cl. ................................. 416/132 B; 416/23; 416/119; 416/240; 416/DIG. 5
[58] Field of Search ............... 416/119, 132 B, 132 R, 416/240 A, 240 R, DIG. 5, 23, 24

[56] References Cited

U.S. PATENT DOCUMENTS

| | | | |
|---|---|---|---|
| 1,266,472 | 5/1918 | Howe | 416/240 A X |
| 2,126,813 | 8/1938 | Reid | 416/240 R X |
| 2,319,286 | 5/1943 | Andresen | 416/240 A X |
| 3,292,710 | 12/1966 | Grut | 416/240 R X |
| 3,614,260 | 10/1971 | Ellinger | 416/DIG. 5 X |
| 4,052,134 | 10/1977 | Rumsey | 416/119 |
| 4,341,176 | 7/1982 | Orrison | 416/DIG. 5 X |
| 4,430,044 | 2/1984 | Liljegren | 416/119 |
| 4,530,642 | 7/1985 | Yang | 416/119 |
| 4,545,729 | 10/1985 | Storm | 416/132 B |

FOREIGN PATENT DOCUMENTS

| | | | |
|---|---|---|---|
| 100913 | 9/1925 | Austria | 416/240 X |
| 2827044 | 12/1978 | Fed. Rep. of Germany | 416/240 A |
| 30075 | 1/1926 | France | 416/240 R |
| 2289764 | 5/1976 | France | 416/240 A |
| 2290585 | 6/1976 | France | 416/DIG. 5 |
| 2468002 | 4/1981 | France | 416/119 |
| 151283 | 11/1981 | Japan | 416/240 A |
| 577300 | 10/1977 | U.S.S.R. | 416/240 A |

Primary Examiner—Everette A. Powell, Jr.
Attorney, Agent, or Firm—H. Gordon Shields

[57] ABSTRACT

Wind turbine apparatus includes a plurality of air foil sail elements secured to a circular frame rotatable in response to wind reacting with the sail elements. The sail elements include deformable outer skin portions, one of which is flattened against an interior form in response to wind forces, and the other of which extends convexly away from the interior form. The deformation changes the camber of the sail element.

13 Claims, 14 Drawing Figures

FIG_6A  FIG_6B  FIG_6C

FIG_7

WIND TURBINE APPARATUS

CROSS-REFERENCE TO RELATED APPLICATION

This application is a division of application Ser. No. 518,047, filed July 28, 1983, now U.S. Pat. No. 4,545,729.

BACKGROUND OF THE INVENTION

1. Field of the Invention

This invention relates to wind turbine apparatus and, more particularly, to air foil sail apparatus for wind turbines.

2. Description of the Prior Art

U.S. Pat. No. 155,472 discloses a wind turbine having a horizontal axis of rotation and a control system which employs a movable weight. The movement of the weight causes the pitch of the sails to vary such that the speed of rotation is diminished as the force of the wind increases. This provides a regulatory system or control system for holding the speed of rotation relatively constant even though the velocity of the wind varies substantially.

U.S. Pat. No. 215,035 discloses another type of wind turbine having a vertical axis of rotation and vanes or sails that are expanded or contracted in accordance with the wind speed through a control system which includes a coil spring. The sails or buckets are secured to fixed or rigid top and bottom elements which move towards and away from each other in response to wind speed and the force of the coil spring. The greater the wind velocity, the closer the top and bottom elements of the sails or buckets are together, thus diminishing the area of the sails available to the wind. Conversely, as the wind velocity diminishes, a greater area of the sails is available to the wind by the movement of the structural elements.

U.S. Pat. No. 227,842 discloses a weight system connected to vanes that control the pitch of the vanes in response to the speed of the wind. The apparatus includes a vertical axis of rotation, with the weights moving vertically in response to the speed of rotation of the apparatus.

U.S. Pat. No. 243,169 discloses a horizontally rotating element having flexible sails. The sails are triangular in configuration, with one edge of the sails relatively fixed and a corner of the sails secured to a weight system which allows the sails to spill wind when the rotation speed increases due to increased wind velocity and, when the wind velocity decreases, allows the weight to move to increase the area of the sails available to catch the wind.

U.S. Pat. No. 1,804,493 discloses another vertical axis of rotation wind turbine which includes tension springs and weights. The combination of the springs and weights causes the sails to furl as the wind speed increases. As the wind speed decreases, the tension spring and the weights cause the sails to unfurl, thus allowing greater sail area to be available to the wind.

U.S. Pat. No. 2,015,777 discloses a horizontal axis of rotation using triangular shaped sails and tension springs. As wind speed increases, the tension springs stretch and the vanes flatten out so as to decrease the area of the sails or vanes available to the wind. As the wind speed decreases, the sails or vanes are pulled by the tension springs to provide a greater frontal area available to the wind.

U.S. Pat. No. 4,191,507 discloses another type of wind turbine having a vertical axis of rotation and a plurality of sails. The sails have a fixed edge and a flexible edge. When the fixed edge is the trailing edge, the sails are available to the wind, but when the fixed edge is the leading edge to the wind, the sails flatten out to decrease the drag. The apparatus is designed for minimizing drag in a lightweight windmill.

All of the above noted patents are of the drag type. Some of the above noted patents have horizontal axes of rotation and some have vertical axes of rotation. In general, vertical axis rotors have a major advantage over horizontal axis rotors in that they do not have to be turned into the wind as the direction of the wind changes. This simplifies the design requirements of the system and at the same time decreases or eliminates certain forces which may cause more stress on blades, bearings, and other elements or components of horizontal axis systems.

Vertical axis drag devices of the prior art generally have relatively high starting torques, but they also usually have relatively low tip-to-wind speeds and relatively low power outputs per given rotor size and weight.

With rotors utilizing aerodynamic configurations to provide lift force, relatively high tip-to-wind speeds and accordingly relatively high power outputs per given rotor size, etc., are provided. However, the control systems for varying the rotational speed of the rotors includes the control of the pitch of the particular blade or air foil. For drag devices, the control systems generally include apparatus for controlling the size of the drag device, usually a sail, that is available to the wind. In general, as the wind speed increases, the size of the sail decreases, and vice-versa, to provide a relatively constant rotational speed. The above-discussed patents disclose several different types of control systems.

As is well known and understood, the greater the diameter of the rotor, the slower the revolutions per minute may be to provide a relatively high tip speed. In the apparatus of the present invention, the diameter of the rotor may be virtually any size, depending on the land available, the terrain, and other factors.

SUMMARY OF THE INVENTION

The air foil sail apparatus described and claimed herein comprises sail elements for wind turbine apparatus having a vertical axis of rotation and utilizing the air foil sail elements. The air foil sail elements are journaled for rotation on support elements which are part of the wind turbine frame. The air foil sail elements include an interior form and an outer skin deformable against the interior form.

Among the objects of the present invention are the following:

To provide new and useful air foil elements;

To provide new and useful air foil sail elements for wind turbine apparatus;

To provide new and useful air foil sail apparatus for utilizing the energy of wind; and To provide new and useful air foil sail elements having deformable outer skins.

DESCRIPTION OF THE PREFERRED EMBODIMENT

Figure 1:
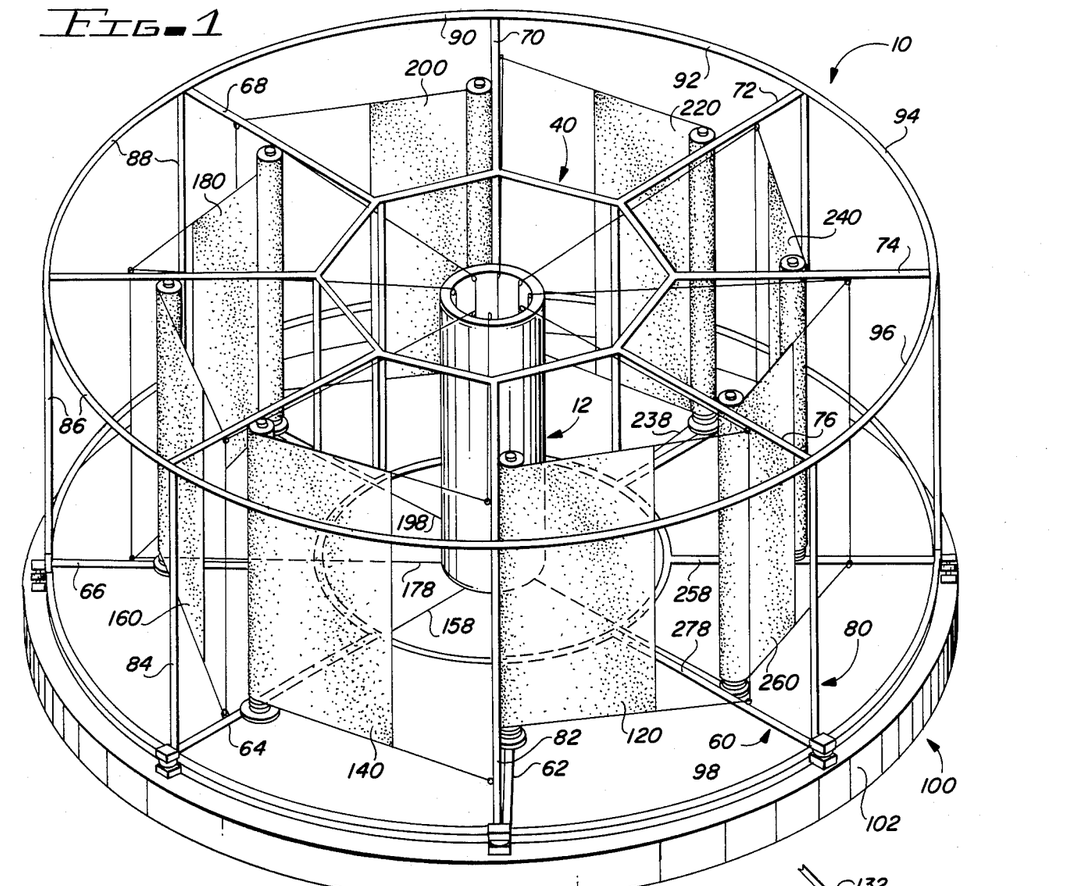
FIG. 1 is a perspective view of an embodiment of apparatus utilizing the apparatus of the present invention.
Figure 2:
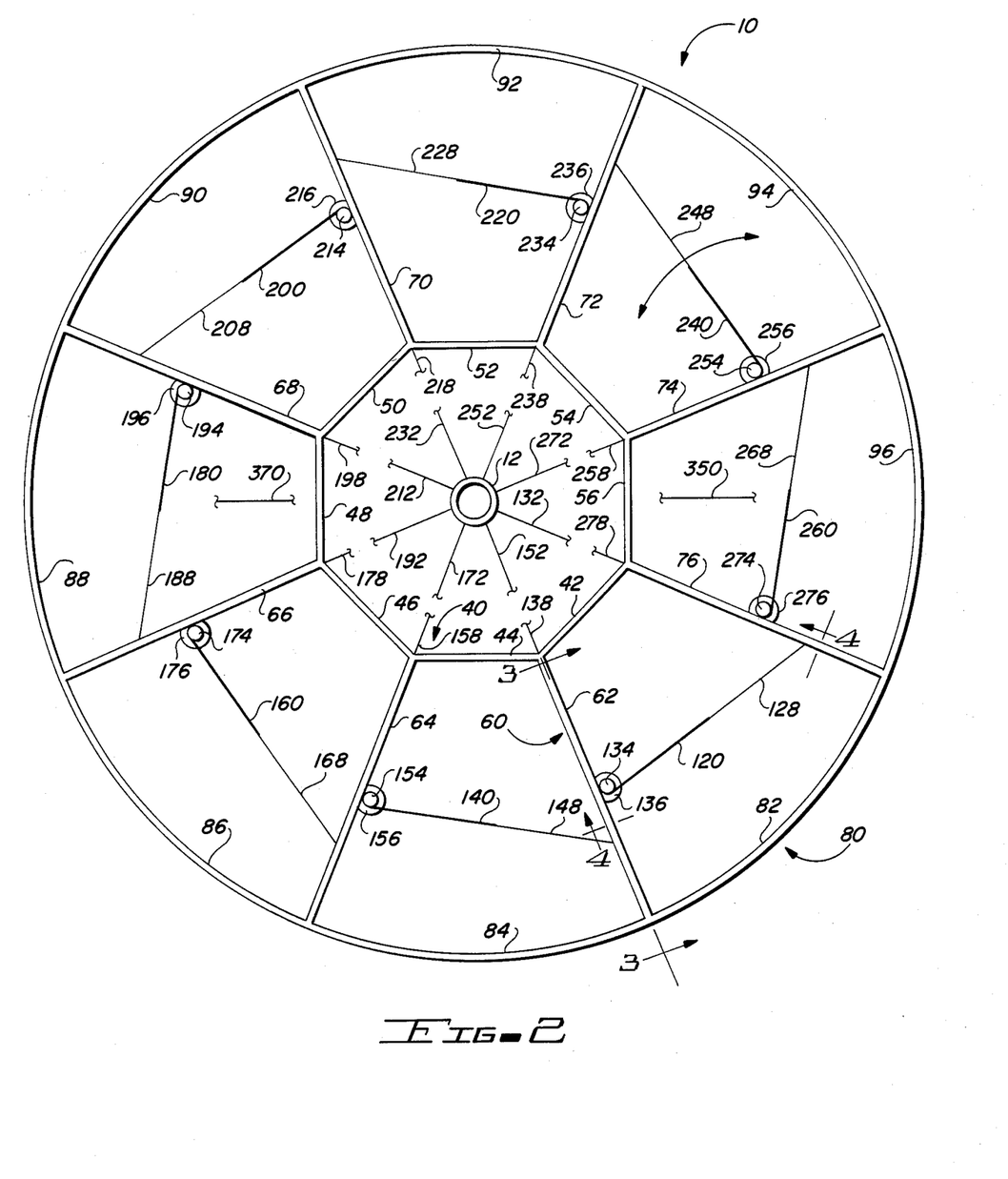
FIG. 2 is a top schematic representation of the apparatus of FIG. 1.
Figure 3:
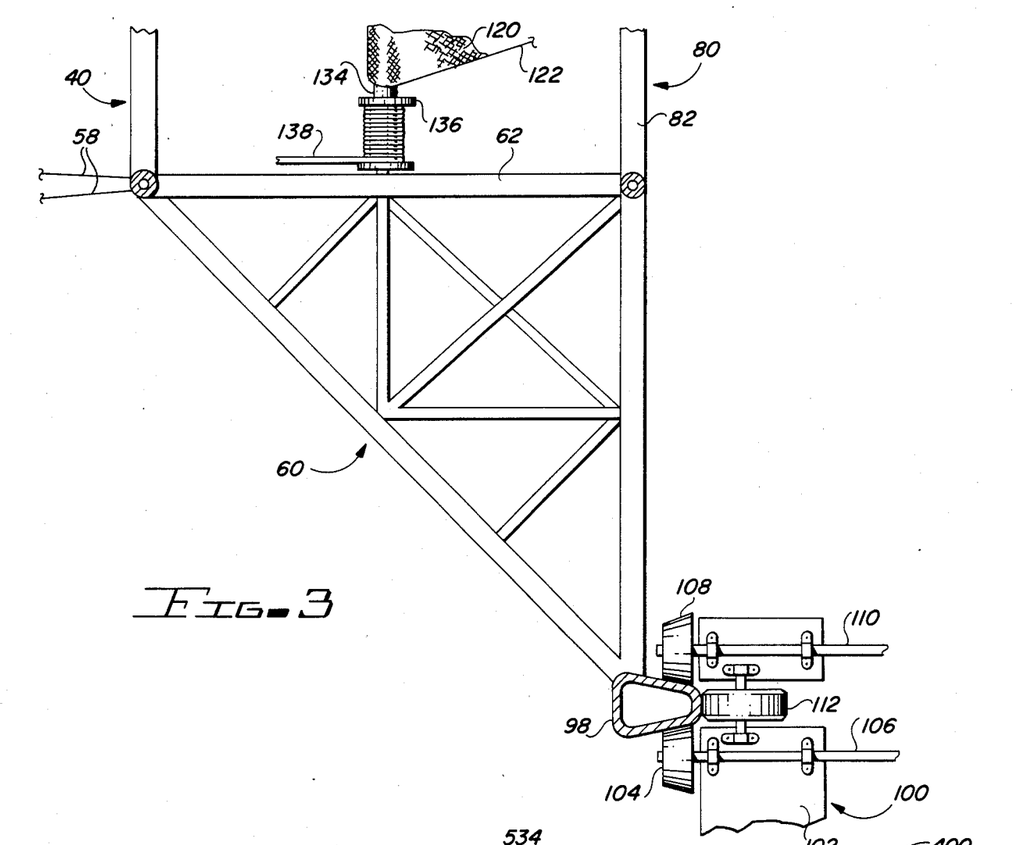
FIG. 3 is a view of a portion of the apparatus of FIG. 2 taken generally along line 3—3 of FIG. 2.
Figure 4:
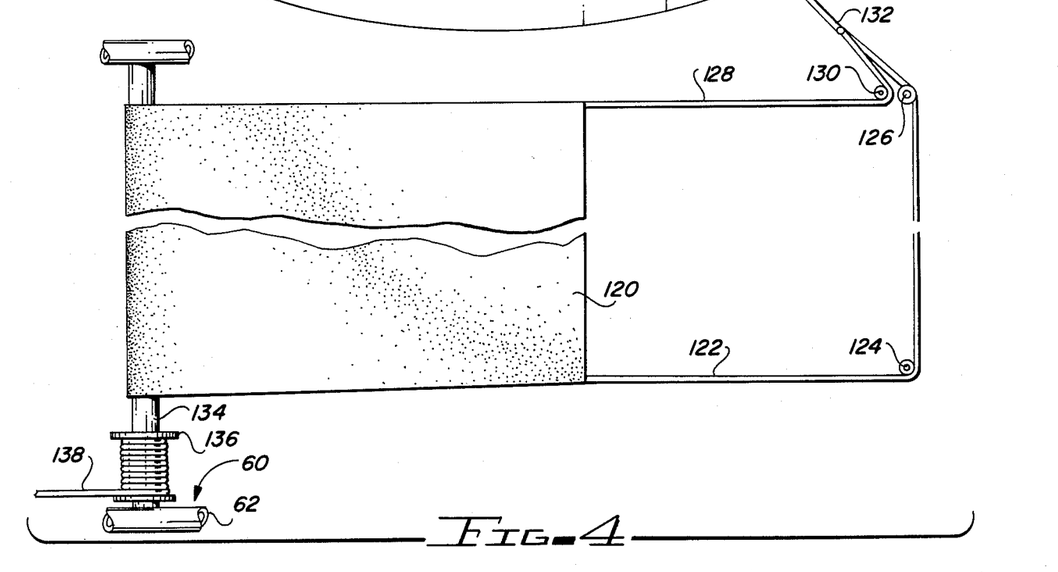
FIG. 4 is a view of another portion of the apparatus of FIG. 2, taken generally along line 4—4 of FIG. 2.

FIG. 1 is a perspective view of wind turbine apparatus 10 of the present invention. FIG. 2 is a top view of the wind turbine apparatus 10 of FIG. 1. The wind turbine apparatus 10 is schematically represented as having eight sails secured to a frame. The control of the sails, as far as furling and unfurling the sails is concerned, is accomplished through a cable system, discussed below, which extends to a center pole or column 12. FIG. 3 is a view in partial section of the wind turbine apparatus 10 of FIGS. 1 and 2, taken generally on line 3—3 of FIG. 2. FIG. 4 is a side view of a sail and illustrating some of the elements associated therewith, taken generally along line 4—4 of FIG. 2. For the following discussion, reference will primarily be made to FIGS. 1, 2, 3, and 4.

The wind turbine apparatus 10 includes, generally, two concentric frames, including an inner frame 10 and an outer frame 80. A connecting frame 60 extends between the inner and outer frames. The eight sails and their various elements are secured to the frames. As best shown in FIG. 2, the inner frame is of a general octagonal configuration, while a portion of the outer frame may similarly be octagonal, but the other frame 80 also includes a circular outer peripheral power rail 98. This is best illustrated in FIG. 3. While both inner and outer frames could be entirely circular in their configuration, the advantage of utilizing octagonal configurations for the basic frame structure lies in the less expensive cost of manufacturing the frames. The reason for the circular outer rail 98 will be discussed below.

Of the inner frame, eight portions are illustrated in FIG. 2. The eight segmental portions include a portion 42, a portion 44, a portion 46, a portion 48, a portion 50, a portion 52, a portion 54, and a portion 56. The portions, together, define an inner octagonal frame.

The outer frame also includes eight segments or portions, which are generally parallel to the inner frame portions. The outer frame portions include an outer frame portion 82, a portion 84, a portion 86, a portion 88, a portion 90, a portion 92, a portion 94, and a portion 96. The outer frame portion 82 . . . 96 also define an octagonal outer frame, substantially parallel to, and concentric with, the inner frame 40. However, it will be understood that the configuration of the outer frame is such as to enable the sail elements, discussed below, to move in response to wind forces with adequate clearance so as to prevent interference between the frame and the sail elements as they move.

The connecting frame 60 is likewise divided into eight portions, namely a portion 62, a portion 64, a portion 66, a portion 68, a portion 70, a portion 72, a portion 74, and a portion 76. The portions 62 . . . 76 extend generally radially between the inner frame 40 and the outer frame 80, and the respective portions thereof.

As best shown in FIG. 3, and also as shown in FIG. 2, the outer peripheral power rail 98 is secured to the bottom of the outer frame and the connecting frame. While the various frame members, as discussed above, are comprised of generally straight structural elements, the outer peripheral power rail 98 is circular. The cross-section of the power rail 98 is, however, somewhat wedge-shaped or of a slightly beveled configuration, with the outer periphery of the rail having a lesser height or thickness than the inner part of the rail.

The power rail tapers outwardly from its inner periphery so as to mate with appropriately beveled wheels in a manner similar to the mating of gears. The extent of the taper varies with the radius of the apparatus 10, and specifically of the outer frame 80.

In order to have the maximum area of the power rail 98 bear on a pair of power wheels, namely a lower power wheel 104 and an upper power wheel 108, and a plurality of additional power wheels (not shown) that are spaced apart about the periphery of the apparatus 10, the power rail 98 has the tapered or beveled configuration illustrated in FIG. 3. The power wheels have a mating or corresponding taper, and are thus frusto-conical in configuration.

The power wheels 104 and 108 are journaled for rotation in appropriate bearings and supported by a support structure 100. The support structure 100 includes a base 102. The base 102 may be a generally solid base extending about the periphery of the wind turbine apparatus 10, or it may include a plurality of spaced apart pylons, etc. The configuration of the support structure 100 accordingly depends on the overall size and weight of the turbine apparatus 10.

The lower power wheel 104 includes an axle or power takeoff shaft 106, and the upper power wheel 108 includes a power takeoff shaft or axle 110. The shafts 106 and 110 extend to appropriate or desired apparatus, such as generators, etc.

A guide or thrust wheel 112, which is appropriately journaled for rotation in the vertical plane, or substantially perpendicularly to the power takeoff wheels 104 and 108, is also secured to the base 102 of the support structure 100. The outer periphery of the power rail 98 bears against the guide or thrust wheel 112.

The two power wheels 104 and 108 and the guide or thrust wheel 112, as illustrated in FIG. 3, are typical of a plurality of such wheel assemblies spaced apart about the periphery of the outer frame 80 of the wind turbine apparatus 10. The number of such assemblies depends generally on the size of the turbine apparatus 10. Moreover, it will be understood that not all of the power wheels need to include power takeoff shafts. Some of them may actually be idler wheels used for support purposes rather than for the combined purposes of support and power takeoff.

Extending between adjacent portions of the connecting frame 60, and disposed between the inner frame 40 and the outer frame 80, are a plurality of sail elements. The sail elements, eight in number, include a sail 120, disposed between the inner frame portion 42 and the outer frame portion 82, and the connecting frame portions 62 and 76, a sail 140 disposed between the inner frame portion 44 and the outer frame portion 84 and the connecting frame portions 64 and 62, a sail 160 disposed between the inner frame portion 46, the outer frame portion 86, and the connecting frame portions 66 and 64. Also, a sail 180 is shown extending between the inner frame portion 48 and the outer frame portion 88 and the connecting frame portions 68 and 66, a sail 200 is shown disposed between the inner frame portion 50 and the outer frame portion 90 and between the connecting frame portions 70 and 68, and a sail 220 is shown disposed between the inner frame portion 52 and the outer frame portion 92, and the connecting frame portions 70 and 72. In addition, there is a sail 240 shown disposed between the inner frame portion 54 and the outer frame portion 94 and between the connecting frame portions 72 and 74, and finally a sail 260 is shown disposed between the inner frame portion 56 and the outer frame portion 96, and between the connecting frame portions 74 and 76.

One side of each sail is fixed to a sail roller, and the opposite side of each sail, remote from the sail roller, is secured to cables which extend to an evener cable which is secured to a weight within the central column or shaft 12. The bottom of the weight within the center column or cylinder 12 is connected, again by a cable connection, to a reel at the bottom of each sail roller.

The sail 120 is connected to a sail roller 134. At the bottom of the sail roller 134 is a reel 136. The sail 140 is secured to a sail roller 154. At the bottom of the sail roller 154 is a reel 156.

The sail 160 is secured to a sail roller 174, and a reel 176 is secured to the bottom of the sail roller 174. The sail 180 is secured to a sail roller 194, and a reel 196 is disposed on the bottom of the sail roller 194. The sail 200 is secured to a sail roller 214, and a reel 216 is secured to the bottom of the sail roller 214.

The sail 220 is secured to a sail roller 234, and a reel 236 is disposed at the bottom of the sail roller 234. The sail 240 is secured to a sail roller 254, and a reel 256 is secured to the bottom of the sail roller 254. Finally, the sail 260 is secured to a sail roller 274, and a reel 276 is disposed at the bottom of the sail roller 274.

FIG. 4 is a front view of the sail 120, shown secured to the sail roller 134. Some of the details of the sail 120, its roller 134, and reel 136, are also shown in FIG. 3. For the following discussion of the sail member 120, and its associated elements, reference will primarily be made to FIG. 4. Reference may also be made to FIGS. 2 and 3 for additional details.

The sail roller 134, with the reel 136 secured thereto, is appropriately journaled for rotation on the connecting frame portion 62 of the connecting frame 60. The diameter of the reel 136 is greater than that of the sail roller 134. A cable 138 is wound about the reel 136 and extends to the center shaft or column 12. This will be discussed in detail below, primarily in conjunction with FIG. 5.

The outer or trailing or free end of the sail 120, as opposed to the inner or fixed end of the sail 120 which is secured to the roller 134, is secured to a pair of cables or lines 122 and 128. The term "free" will generally be used hereinafter to denote the outer end of the sails remote from the sail rollers. The lower cable or line 122 extends from the outer bottom corner of the sail 120 over a pulley 124 and upwardly to an upper pulley 126. The upper trailing corner of the sail 120 is secured to one end of an upper cable or line 128. The cable 128 extends outwardly, generally parallel to the cable 122, to a pulley 130. The pulley 130 is disposed adjacent to the pulley 126.

From the pulley 130, the upper cable 128 extends adjacent to the upper end of the lower cable 122 to a common juncture where both the cables 122 and 128 join to a single inner top cable or line 132. The inner top cable 132 then extends to the center shaft or column 12 where it is secured to a weight 300, as will be discussed below. The upper cable 128 is schematically represented in FIG. 2, and the outer cable 132 is also schematically represented in FIG. 2. The pulleys 124, 126, and 130 are appropriately secured to the connecting frame portion 76. The securing connections of the pulleys to the frame portion 76 is not illustrated. However, FIG. 2, which is a schematic representation, shows the upper cable 128 extending from the outer or free end of the sail 120 to the connecting frame portion 76.

The sail 120, with its roller 134, the reel 136, and the cables 122, 128, 132, and 138, with the several pulleys, are typical of all eight of the cable, reel, and pulley assemblies associated with the sails illustrated best in FIG. 4. The lower or bottom control cables are not shown in FIG. 2, but the upper control cables are schematically represented, along with the inner top control cables which extend from the juncture of the upper and lower control cables inwardly towards the center of the apparatus. This will be discussed in more detail below.

In FIG. 2, an upper control cable 148 is shown extending from the free end of the sail 140 to the connecting frame portion 62. The cable 148, and a parallel bottom cable, not shown, are ultimately connected to an inner top control cable 152. The inner top control cable 152 is schematically illustrated in FIG. 2, adjacent to, and extending radially inwardly to/outwardly from, the center shaft or column 12, or between the shaft 12 and the sail element 140.

An upper control cable 168 is shown secured to the free end of the sail 160. The cable 168 extends from the sail 160 to the connecting frame portion 64. The cable 168, and a lower control cable, now shown, both extend to an inner top control cable 172. The control cable 172 is shown extending radially outwardly from, or inwardly towards, the center column or shaft 12.

An upper control cable 188 is shown extending outwardly from the sail 180 to the connecting frame portion 66. An inner top control cable 192 is shown extending radially outwardly from the center column or shaft 12 toward the connecting frame portions 66. The cable 192 is connected to the cable 188 and to a parallel, lower control cable, not shown.

An upper control cable 208 is shown extending outwardly from the free end of the sail 200 toward the connecting frame portion 68. A mating inner top control cable 212 is shown extending outwardly from the center shaft 12 toward the connecting frame portion 68 where it is secured to the upper control cable 208 and to its lower, parallel control cable, not shown.

An upper control cable 228 is shown extending outwardly from the sail 220 to the connecting frame portion 70. The cable 228, and a parallel, lower control cable, not shown, are secured to the connecting frame portion 70 and to an inner top control cable 232 which extends to the center shaft 12.

An upper control cable 248 is shown extending outwardly from the free end of the sail 240 towards the connecting frame portion 72. The upper control cable 248 and a lower control cable, not shown, disposed generally parallel to the cable 248, are both secured to an inner top control cable 252. The control cable 252 extends to the center column 12.

Finally, an upper control cable 268 is shown extending from the free end of the sail 260 to the connecting frame portion 74 where it, and a lower, parallel control cable, not shown, are both secured. The upper and lower control cable are connected to an inner top control cable 272. The inner top control cables 132 ... 272 are all shown radially extending outwardly from, or inwardly towards, the column or shaft 12 in FIG. 2. The cable 132 is also shown in FIG. 4.

It will be noted that the sails 120 ... 260 are extending generally perpendicular to a radius from the center of rotation of the apparatus 10 to the midpoint of each sail. As shown in FIG. 2, the sails 120 ... 260 are shown in a static, no-wind situation, where the sails are in such an orientation as to have the plane of the sails perpendicular, at the midpoint of the sails, to such a radius.

From FIG. 4, it will be noted that the sails may not be rectangular in configuration. Rather, they may taper slightly so that the length of the outer, free edge of a sail may be shorter in length than the fixed end of the sail as secured to a sail roller. The purpose of this is to prevent the sails from rubbing on or against the various frame elements. As shown in FIG. 4, the bottom edge of the sail 120 tapers upwardly and outwardly from the said roller 134 to the outer free edge of the sail where the lower control line or cable 122 is connected.

Figure 5:
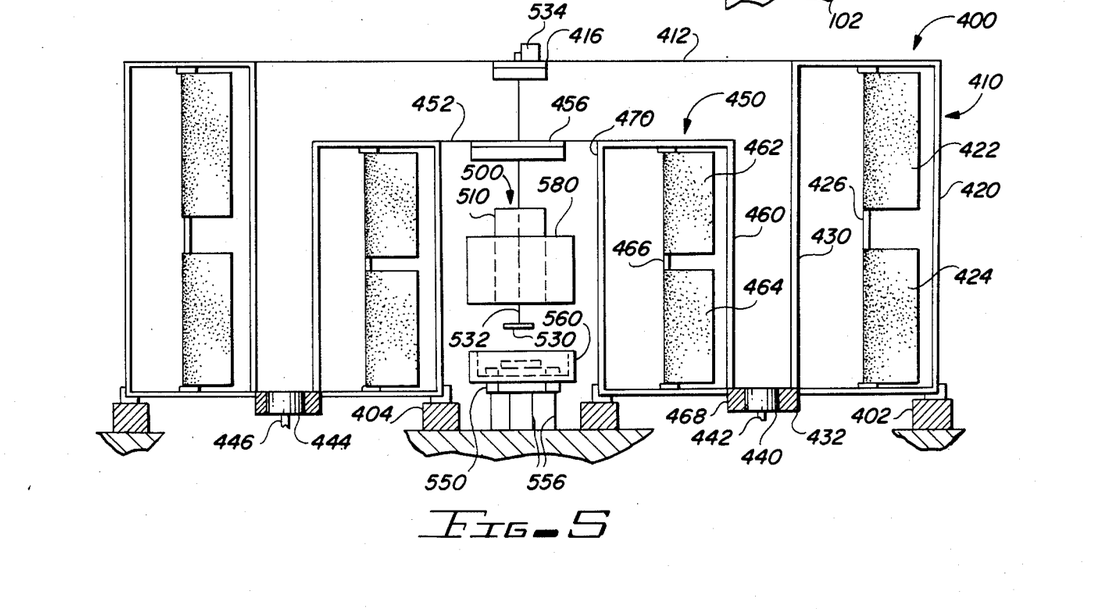
FIG. 5 is a schematic representation of an alternate embodiment of a portion of the apparatus of the present invention.

FIG. 5 is a schematic representation of an alternate embodiment of the apparatus of FIGS. 1-4, comprising a counter-rotating concentric wind turbine apparatus 400.

The counter-rotating concentric turbine apparatus 400 of FIG. 5 includes an outer system 410 and an inner system 450. The outer system 410 and the inner system 450 rotate in opposite directions. Power is taken from planetary gears or power wheels disposed between the inner and outer systems. While gears will be discussed, power rails and wheels, as discussed above, may be used. The planetary gears include a planetary gear 440 having a power takeoff shaft 442 and a planetary gear 444 having a power takeoff shaft 446. The planetary gears 440 and 444 are rotated by frame elements secured to the inner periphery of the outer system 410 and the outer periphery of the inner system 450.

The outer system 410 is disposed on an appropriate support structure 402 and is journaled for rotation thereon. The inner system 450 is disposed on an appropriate support structure 404 and is journaled for rotation thereon.

The outer turbine system 410 of the counter-rotating concentric wind turbine apparatus 400 includes an outer frame 420 and an inner frame 430. the outer frame 420 and the inner frame 430 are appropriately spaced apart and, on additional structural elements extending between the outer and inner frames, are a pair of stacked sail systems. The sail systems include a top sail system 422 and a bottom or lower sail system 424. For convenience, the top sail system and the lower or bottom sail system are disposed one above the other and are appropriately secured to sail rollers which are supported on the structural framework which extends between the outer and inner frames.

The top and bottom sail systems are illustrative of a vertical orientation of a plurality of sails if such is desired. In the embodiment of FIGS. 1-4, only a single sail system is illustrated. However, it will be understood that the number of sails may be vertically increased, with more than one sail secured to vertically disposed sail rollers. For convenience, only a single said roller 426 is shown in FIG. 5, and a sail of the upper sail system 422 and a sail of the lower sail system 424 are shown secured to the single sail roller 426. Normally, a sail roller will have only a single sail.

At either the top or the bottom of each sail roller, such as the sail roller 426, there may be a reel secured to the roller on which the sails are furled and from which the sails are unfurled. Control cables extend from the reels to a control weight, all as discussed in general terms above in conjunction with the embodiment of FIGS. 1-4.

With a concentric system, such as the apparatus 400 of FIG. 5, the placement of the control cables for the reels and the sail rollers for the outer system 410 will of necessity be above the inner system 450. Accordingly, the placement of the reels for the sail rollers may most conveniently be at the top of the sail rollers, but they may also be at the bottom of the sail rollers, if desired.

For purposes of clarity, reels and control cables for the sail elements and reels have been omitted from FIG. 5.

Extending between the upper portions of the inner frame 430 of the outer system 410, and extending generally diametrically, are a plurality of support cables 412. The support cables 412 extend to a center ring 416. The ring 416 is disposed in the center of the apparatus 400 and is used to support the pulleys and other apparatus associated with the weight control system.

Secured to the bottom inner periphery of the inner frame 430 of the outer system 410 is a ring gear or power rail 432. The ring gear 432 meshes with the planetary gears 440 and 444 for purposes of a transferring power from the apparatus 400.

The inner system 450 is generally similar to the outer system 410. It includes an outer frame 460 and an inner frame 470. Appropriate support structure extends between the outer frame 460 and the inner frame 470 for purposes of providing support for the sail system of the inner system 450. The sail system may include a top sail system 462 and a lower or bottom sail system 464. A said roller 466 is shown, with sails of the upper sail system 462 and the lower sail system 464 both secured to the sail roller 466. That is, as with the outer system 410, a pair of vertically oriented sails is secured to each sail roller.

Disposed at the outer periphery of the outer frame 460 of the inner system 450 is a ring gear 468. The ring gear 468 also meshes with the planetary gears 440 and 444. The power takeoff shafts 442 and 446 of the planetary gears 440 and 444, respectively, may be appropriately connected to other apparatus, as desired, for utilization of the power derived from the apparatus 400. In FIG. 5, only two planetary gears are illustrated. However, it will be understood that as many planetary gears will be utilized as desired or needed for the utilization of power from the apparatus.

Extending diametrically across the inner system 450 are support cables 452. The support cables 452 extend to a ring 456 which is larger in diameter than, and is generally aligned with, the ring 416. The ring 456 is used for supporting the cables necessary for the control of the sail elements for the inner system 450.

In the center of the inner system 450 is a control system 500 which comprises the weight and related elements for controlling the furling and unfurling of the sail elements for both the outer system 410 and the inner system 450. The control system 500 includes a center shaft 510 and a weight 580 which is disposed about the center shaft 510. The shaft 510 and weight 580 are movable. The shaft 510 and the outer weight 580 rotate, along with the rotation of the outer and inner systems to which they are respectively secured. The control system 500 includes a plate 530 secured to a cable 532 for raising the shaft 510 and weight 580 by a winch 534. Also included are a fixed control plate 550, held in place by cables 556, and a rotating control plate 560. The control plates 550 and 560 are associated, respectively, with the shaft 510 and the weight 580. The control system 500 is discussed in detail in the parent application.

Figure 6A:
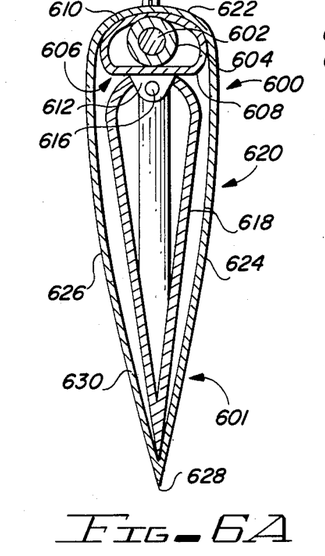
FIG. 6A is a view in partial section of an alternate embodiment of a portion of the apparatus of the present invention.
Figure 6B:
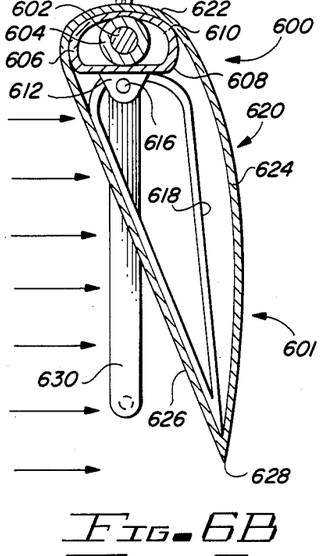
FIGS. 6B and 6C are sequential views illustrating the operation of the apparatus of FIG. 6A.
Figure 6C:
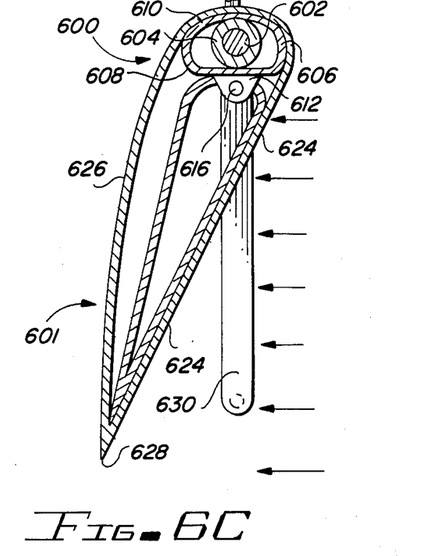

FIGS. 6A, 6B, and 6C are sequential views illustrating an air foil sail element or apparatus 600, which comprises an alternate sail embodiment from that discussed in conjunction with the embodiments of FIGS. 1-5. FIG. 6A shows the air foil sail element 600 in a static, symmetrical configuration. FIG. 6B illustrates the air foil element 600 disposed from its static location by a wind force from the left, as shown. FIG. 6C shows the air foil element 600 displaced from its center, static symmetrical position, by a wind force from the right.

Figure 7:
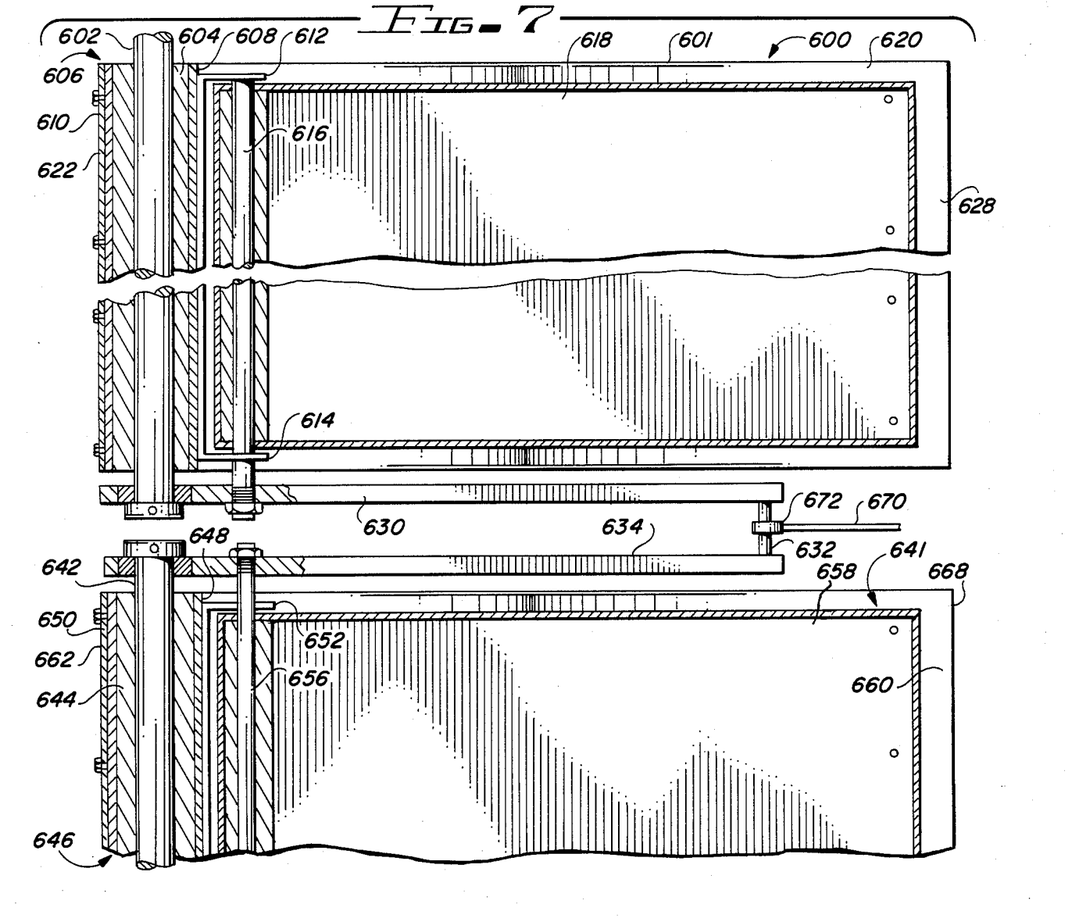
FIG. 7 is a side view in partial section of the apparatus of FIG. 6A.

FIG. 7 is a view in partial section showing a portion of the air foil sail apparatus 600 in partial section. FIG. 7 is taken generally from the side, and thus comprises a general elevational view in partial section.

Figure 8:
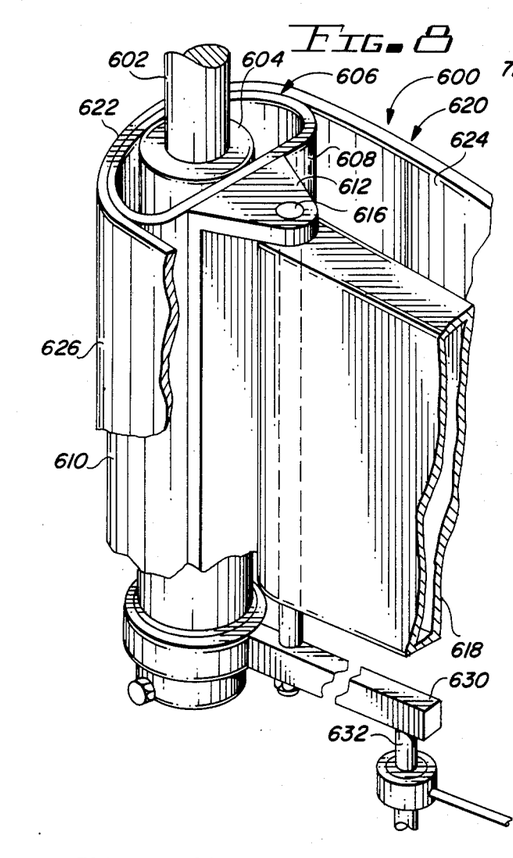
FIG. 8 is a perspective view, partially broken away, of a portion of the apparatus of FIG. 7.

FIG. 8 is a perspective view of a portion of the air foil sail apparatus 600, with a part broken away.

For the following discussion, reference will generally be made to FIGS. 6A, 6B, 6C, 7, and 8.

The air foil sail apparatus 600 may be used in place of the sail elements discussed above in conjunction with FIGS. 1-5. The air foil apparatus 600 includes two sail elements which are vertically aligned and which do not furl and unfurl on a sail roller. Rather, the air foil sail elements move or rotate on support rods which take the place of sail rollers and they include separate pivot rods on which the air foil sail elements may move. The movement causes a flexing of the air foil sail elements to change the camber of the air foil, and accordingly to change the aerodynamic lift derived from the air foils. The air foil sail apparatus 600 includes two portions, an upper air foil sail element 601 and a lower air foil sail element 641. The two air foil elements are connected together by a pair of links 630 and 634 for the upper and lower elements 601 and 641, respectively. The links 630 and 634 are tied together by a single connecting pin 632.

The upper air foil 601 is disposed on an upper support rod 602, while the lower air foil 641 is disposed on a lower support rod 642. The rods 602 and 642 are aligned with each other, but are spaced apart to allow a control cable 670 to pass through, thereby permitting the links 630 and 634, their connecting pin 632 and the air foils, to rotate freely for a complete 360° revolution if necessary. The upper air foil 601 is appropriately journaled for rotation on the support rod 602, and the lower air foil 641 is appropriately journaled for rotation on the lower support rod 642.

The upper air foil 601 is journaled for rotation on the support rod 602 by a bearing 604. The lower air foil 641 is journaled for rotation on the rod 642 by a bearing 644.

The framework necessary to support the upper and lower air foils is not shown. However, it will be understood that framework similar to that discussed above in conjunction with the embodiment of FIGS. 1-4 and the embodiment of FIG. 5 will be used to support the air foil sail elements. Since the air foil sail elements do not include sail rollers, lower control cables, discussed above in conjunction with the embodiments of FIGS. 1-5 will not be required. However, instead of the control cables associated with the furling and unfurling of the sail elements discussed in FIGS. 1-5, the air foil sail elements of FIGS. 6A-9 include a single control cable, which will be discussed below.

Appropriately secured to the bearing 604 is a form 606. The form 606, as best shown in FIGS. 6A, 6B, and 6C, is generally in the form of a "D" which includes a flat base 608 and a curved nose 610. The form 606 is used to help define the aerodynamic curvature of the upper air foil 601. The bearing 604 is disposed in the center of the form 606.

Extending rearwardly from the flat base 608, and thus away from the curved nose 610, are a pair of tabs. The tabs include a top tab 612 and a bottom tab 614. The tabs extend outwardly from the flat base 608, and thus away from the bearing 604 and from the support rod 602. The tabs 612 and 614 include a pair of aligned apertures through which extends a pivot rod 616.

While the air foils of the apparatus 600 pivot or rotate on the support rods 602 and 642, respectively, the deformation of the air foils, with respect to their aerodynamic characteristics due to the change of the camber of the air foils, is brought about by the pivoting of the air foils relative to their respective pivot rods. The pivot rod 616 is utilized for the upper air foil 601.

Secured to the pivot rod 616 is an interior form 618. The interior form 618 comprises a rigid shell, or form, pivotally secured to the upper pivot rod 616 and extending rearwardly therefrom, or away from the upper support rod 602 and the form 606, and to a trailing edge of the air foil sail element 601.

Disposed about the form 606 and the interior form 618 is an outer skin 620. The outer skin 620 is of springy or deformable material and is generally in the form of an aerodynamically configured air foil. It includes a leading edge 622, which is disposed about the curved nose 610 of the form 606, and a pair of sides 624 and 626 which extend rearwardly from the leading edge 622. The outer skin 620 terminates in a trailing edge 628. The trailing edge 628 is also secured to the trailing edge of the interior form 618. The interior form 618 helps to provide structural integrity for the skin 620 as it moves and deforms. This is best shown in FIGS. 6B and 6C.

The pivot rod 616 extends downwardly from the upper tab 612, through the lower tab 614, and is appropriately secured to the link 630. At the same time, the upper support rod 602 extends downwardly from the apparatus frame, not shown, also to the link 630. The link 630 is appropriately journaled for rotation about the upper support rod 602 and is appropriately secured thereto. As best shown in FIGS. 7 and 8, the link 630 defines the bottom portion of the upper air foil 601, and the support rod 602 accordingly extends upwardly from the link 630 to the frame member (not shown) to which it is secured.

The lower air foil 641 is substantially identical to the upper air foil 601. It includes a lower support rod 642 which is appropriately secured to the link 634. From the link 634, which is appropriately journaled for rotation about the lower support rod 642, the lower support rod 642 extends downwardly to an appropriate frame member (not shown) to which it is secured. As indicated previously, the support rods 602 and 642 are vertically aligned.

Appropriately secured to the bearing 644 is a lower form 646, which is substantially identical to the upper form 606. The form 646 includes a flat base 648 and a curved nose 650. The form 646 also includes a pair of tabs, including a top tab 652, through which extends a lower pivot rod 656.

An interior form 658 is also secured, for pivotal action, on the pivot rod 656. An outer skin 660 is in turn secured to the form 646 and to the interior form 658. The outer skin 660 includes a leading edge 662 and a pair of sides which extend from the leading edge 662 to a trailing edge 668.

Referring to FIG. 6B, a wind from the left, against the side 626 of the skin 620 of the upper air foil 601, causes a deflection of the air foil sail apparatus 600 from the neutral position shown in FIG. 6A. As the air foil apparatus 600 moves, it pivots on two axes. The first pivot axis is on the axis of the pivot rods 616 and 656 and the second is about the axis of rotation on the support rods 602 and 642. A change in the camber of the skins results, with a flattening of the side 626 and an increase in the convex curvature of the side 624 illustrated. The increase in the camber of the side 624 causes an increase in lift of that side, which tends to help move the air foil sail element 600 with the wind in a direction generally perpendicular to the wind by providing a low pressure area generally in the direction of the movement of the apparatus. Thus, in addition to the direct force of the wind against the air foil sail elements 601 and 641 there is also an aerodynamic lift provided by the apparatus 600.

When the wind blows from the opposite direction, as shown in FIG. 6C, the opposite result occurs. That is, there is a flattening of the skin side 624 and an increase in the convex configuration of the skin side 626. The increase in the camber of the side 626 increases the aerodynamic lift by causing a low pressure area on the side 626 which helps to move the air foil sail element system or apparatus 600 perpendicular to the wind.

For controlling the sail element 600, the links 630 and 634 and the connecting pin 632 are used. A control cable 670 is shown in FIG. 7 connected to the pin 632 by an appropriate bearing element 672. Wind force against the aerodynamic sail elements of the air foil apparatus 600 will cause movement of the two air foil elements 601 and 641 in a direction generally perpendicular to the relative wind, except that the air foil elements will pivot with the wind instead of moving generally in a straight line. The movement of the air foil elements will also cause movement of the links 630 and 634 and will thus result in movement of the control cable 670. The control cable 670 corresponds to the upper control cables of the embodiments of FIGS. 1–5 to allow the air foil elements to move with the wind a greater or lesser amount. For example, if the wind causes the air foil elements to move, movement of the links allows the entire air foil to pivot on the support rods. This decreases the angle of attack of the air foil to decrease the aerodynamic lift effect. It also presents less surface area of the air foil to the relative wind, and the air foil sail elements move sideways to spill the excess wind over or against them. As the relative wind decreases, the lessened force of the wind on the air foils permits linear movement of the cable 670 to allow the air foils to pivot to increase the cross sectional area of the wind cut by the air foils. The cable 670 extends to an evener cable (not shown) on a weight (also not shown). The tension of the cable 670 moves the weight vertically in a manner similar to the upper control cables discussed above in conjunction with the embodiments of FIGS. 1–5.

Thus, referring again to the embodiments of FIGS. 1–5, sail elements, such as the sail element 600, may be substituted for the roller sail elements. As indicated above, the same framework is used, and the only elements not needed with the air foil sail elements are the lower control cables secured to the bottom of the weight. The upper control cables, secured to the top of the weight through an evener cable, are still used.

Figure 9:
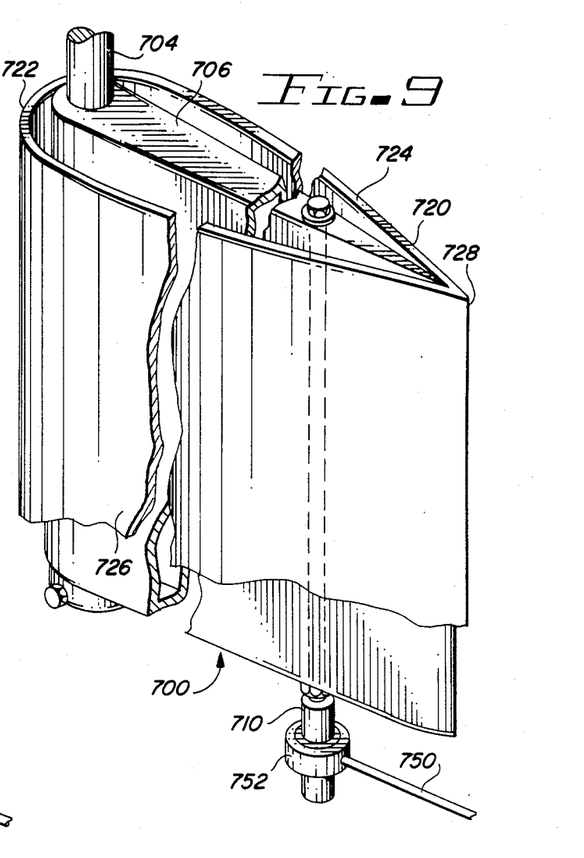
FIG. 9 is a perspective view of another alternate embodiment of a portion of the apparatus of the present invention.

FIG. 9 is a perspective view of another alternate embodiment of the apparatus of the sail element apparatus comprising a part of the present invention. The alternate embodiment comprises an air foil sail element 700. The air foil element 700 is shown in FIG. 9, partially broken away.

Figure 10A:
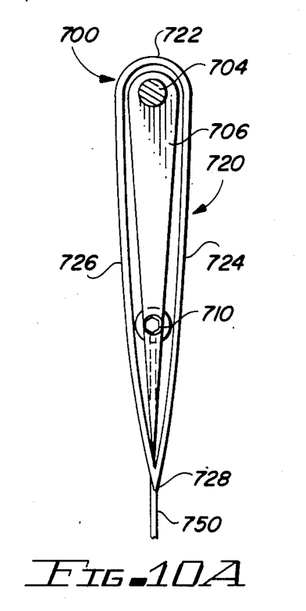
FIGS. 10A, 10B, and 10C are top views sequentially illustrating the operation of the apparatus of FIG. 9.
Figure 10B:
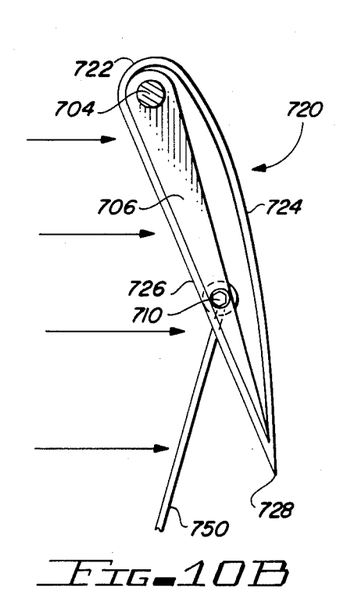
Figure 10C:
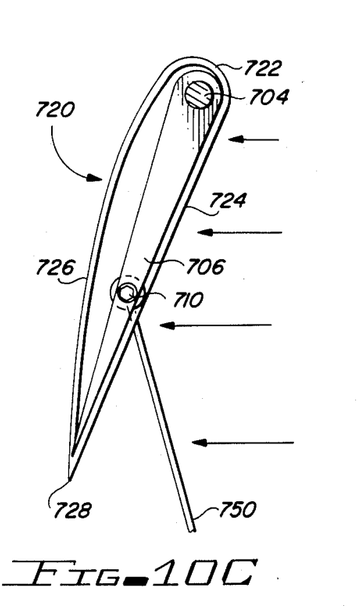

FIG. 10A is a top view of the air foil sail element 700 of FIG. 9. FIG. 10B and FIG. 10C are sequential views of the sail element 700 of FIGS. 9 and 10A. FIG. 10B shows the air foil sail element 700 displaced from the neutral position shown in FIG. 10A by a wind coming from the left. FIG. 10C shows the air foil sail element 700 displaced from the neutral position of FIG. 10A by a wind from the right. For the following discussion of the air foil sail element 700, reference will primarily be made to FIGS. 9, 10A, 10B, and 10C.

The air foil sail element 700 shown in FIG. 9 comprises an upper air foil of a pair of air foils, similar to the air foil system 600 of FIGS. 6A–8, and best shown in FIG. 7. Of the assembly, only the upper air foil is illustrated in the Figures.

The air foil 700 includes a support rod 704 about which the air foil 700 pivots. The support rod is appropriately secured to the framework (not shown) of a wind turbine apparatus from the top. The rod 704 terminates at the bottom of the air foil 700. The rod 704 may be appropriately journaled for rotation in the framework, or in the alternative, the rod 704 may be fixed in place with the air foil 700 journaled for rotation about the rod 704. If the rod 704 is journaled for rotation, then an interior form 706 may be secured thereto. If the rod 704 is fixed in place, the interior form 706 may be appropriately journaled for rotation on the rod 704. The interior form 706 extends from the rod 704 rearwardly and terminates at a trailing edge 728. The form 706 extends slightly forwardly of the rod 704 to define the leading edge of the air foil sail element 700.

Disposed remotely from the rod 704, and closer to the trailing edge 728 than the rod 704, is a pivot rod 710. The pivot rod 710 defines a pivot axis rearwardly from the rod 704 on which the air foil sail element 700 pivots in response to a wind. The air foil sail element 700 has one pivot axis, the rod 704.

Disposed about the interior form 706 is an outer skin 720. The outer skin 720 includes a nose portion 722 which extends forwardly of the pivot rod 704 and forwardly of the front or nose portion of the interior form 706. The skin 720 also includes a pair of sides 724 and 726 which extend rearwardly from the nose 722 and terminate at the trailing edge 728. The skin 720 is secured to the interior form 706 only at the trailing edge 728.

Secured to the pivot rod 710 is a control cable 750. The cable 750 is secured to the pivot rod 710 by a connector and bearing assembly 752. The connector and bearing assembly 752 pivots freely on the rod 710 in response to movement of the air foil sail element 700 as the air foil sail element 700 moves with the wind.

In FIG. 10A, the air foil 700 is shown in its neutral position. In FIG. 10B, the air foil 700 is shown pivoted on the rod 704 in response to a wind coming from the left. The side 726 of the skin 720 is disposed against the left side of the interior form 706, and the right side 724 extends outwardly, thus increasing the camber of the right side of the air foil element 700. Air flowing over the increased camber portion 724 of the skin 700 provides a low pressure lift area which helps move the air foil 700, and the wind turbine apparatus (not shown) to which it is secured, by aerodynamic forces as well as by the direct force of the wind against the air foil sail element 700.

In FIG. 10C, the wind is from the right, or from the opposite direction from that shown in FIG. 10B. The side 724 of the skin 720 is shown disposed against the interior form 706, while the side 726 of the skin extends outwardly, with an increased camber, to thus provide a low pressure lift area on the opposite side of the air foil 700 from that shown in FIG. 10B.

The cable 750 extends to an evener cable secured to the top of a weight, substantially the same as discussed above in conjunction with FIGS. 6A-8 and similar to the upper control cables which extend from sail elements to weights as discussed in conjunction with the embodiments of FIGS. 1-5. The movement of the air foil sail element 700 and its control cable 750, etc., is substantially as discussed above in conjunction with the apparatus 600 of FIGS. 6A-8.

In the embodiments of FIGS. 6A-10C, the outer skin of both embodiments of the air foil sail elements is deformable. Interior forms are used, and the outer skins are spaced apart from the interior forms when the air foil elements are in their neutral or static positions. With wind forces acting on the air foil sail elements, the outer skins deform to a maximum deflection against the interior forms on one side and away from the forms on the other side. This maximum deflection is shown in FIGS. 6B, 6C, 10B, and 10C. Obviously, the skins are made of springy material.

If desired, the air foil sail elements may have a fixed cross section and thus may not deform under wind loads. Such sail elements may preferably have a cross-sectional configuration similar to the cross-sectional configurations shown in FIGS. 6A and 10A, which comprise the neutral or symmetrical renderings of the air foil sail element apparatus 600 and 700, respectively. When using an air foil sail element with a fixed cross-section, the camber on both sides of the chord does not vary and no deflection of the outer skin occurs. Mechanically, this would appear to be a simpler system than those shown in FIGS. 6A-10C.

In the above-discussed embodiments, cables have been illustratively connected to the weights for moving the weights and the various sail elements in response to wind forces. It will be understood that electric motors could be used in place of the direct cable connections, thus providing only electrical connections for moving the weights and the various sail elements. Electric motors thus could be used to control the movement of the weights and to control the movements of the sail elements. Appropriate electrical control elements, such as potentiometers, could be used to sense the wind force as applied to the sail elements and accordingly to provide an output signal in response to the movement of the sail elements. The various electric motors would be used to raise and lower the weights and to furl and unfurl the sail elements or appropriately pivot the air foil sail elements, all in response to predetermined parameters. Hydraulic motors could be used instead of electric motors, if desired. Moreover, electronic control systems, connected to a wind speed or velocity sensing element, such as an anemometer, could also be used. For example, predetermined wind parameters could be programmed into a read only memory (ROM) of a microprocessor. At various wind speeds, microprocessor controlled motors would be actuated to furl or unfurl sail elements, etc.

With the air foil sail elements, as wind speed increases, increased slack is put into the lines to allow the air foils to move in the wind. Ultimately, with a predetermined wind speed, the air foil sail elements turn or rotate freely with the wind. This allows them to virtually "feather" or streamline with the wind. Raising a weight puts the slack into the cables, as discussed above.

In the embodiments of FIGS. 1-5, reels have been illustratively discussed in conjunction with the sail rollers. For certain applications, it may be desirable to utilize spring elements in place of the weight, with the cable connections and reels associated therewith remaining. For example, tension springs may apply a predetermined load on the sail rollers, for example, at a neutral position. An increase in the wind forces may result in an increased pull on the control cables, thereby rotating the reels and rollers, and furling the sails. On the other hand, a decrease in the wind forces may impose a decreased pull on the tension cables which may result in the unfurling of the sails.

There are inherent problems with springs, such as cost, metal fatigue, and variable spring tension. The latter problem is significant in that spring tension increases as distance increases. With a weight system, as shown in the drawing figures, the tension is relatively constant.

Due to the difference in the diameters of the sail rollers and the reels, movement of a sail pulling against a control cable will cause slack in the control cable lines because more cable, linearly, will be unwound from a reel than sail, linearly, will wind on a sail roller as the roller and reel rotate.

In addition to the control systems for the sail elements, a control system for the generators (alternators) connected to the various power takeoff shafts is utilized. As stated above, there are a plurality of power take-off shafts spaced apart from each other, and each shaft is secured to a generator or alternator or other appropriate device.

At a predetermined rotational speed, one or more devices or units will cut in, and then additional devices will cut in at other predetermined speeds. When a maximum rotational speed is achieved, all of the devices will be "on line" for maximum power output.

As the wind force decreases, and rotational speed also decreases, the devices will be cut out in the reverse manner as they were cut in. That is, at a predetermined rotational speed, one or more devices will be cut out. As the rotational speed further decreases, additional devices or units will be cut out.

It will be noted that the amount of power conversion will vary, depending on the velocity of the wind. The power conversion will be low in a relatively low wind, and will increase to a maximum in a wind of a predetermined maximum velocity. Above the predetermined maximum velocity, the sails will be furled or rolled up or the air foils will be allowed to turn free by the raising of the control weights by the winch 534, as discussed above.

The number of power conversion units or devices depends on the size of the wind turbine apparatus and on the size of the individual devices. The placement or spacing of the individual units or devices is preferably based on symmetry so far as practical.

Brakes on the power wheels to lock the apparatus in place have not been shown in the drawing Figures. Obviously, brake elements will be needed.

In the discussion associated with FIGS. 6A through 10C, dual or paired air foil sail elements are shown. If desired, single air foil sail elements may be used or more than two elements may be vertically connected together. The number of elements connected together in any particular embodiment depends on the size, desired output, control system, and other considerations.

The ability of the air foil sail elements 600 and 700 to reverse their camber enhances their efficiency in utilizing wind energy. The camber, in reversing, decreases or flattens on the windward side and increases on the leeward side of an element in response to changes in wind direction.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Air foil sail element apparatus, comprising, in combination:
    support rod means; and
    air foil means journaled for rotation on the support rod means, including
        a pivot rod spaced apart from the support rod means for controlling the pivoting of the air foil means,
        an interior form secured to the pivot rod, and
        a deformable outer skin secured to and disposed about the interior form and deformable against the interior form to change the camber of the air foil in response to wind.
2. The apparatus of claim 1 in which the air foil means further includes a bearing secured to the support rod means, and the interior form is journaled for rotation on the bearing.
3. The apparatus of claim 1 in which the air foil means further includes an upper air foil and a lower air foil, and the upper and lower air foils respectively include upper and lower pivot rods, upper and lower interior forms, and upper and lower deformable outer skins.
4. The apparatus of claim 3 in which the support rod means includes an upper support rod secured to the upper air foil and a lower support rod secured to the lower air foil.
5. The apparatus of claim 4 in which the support rod means further includes a first link extending from the upper support rod and a second link extending from the lower support rod.
6. The apparatus of claim 5 in which the support rod means further includes a connecting pin connecting the first and second links.
7. The apparatus of claim 6 in which the upper and lower pivot rods are respectively connected to the first and second links.
8. The apparatus of claim 7 in which the air foil means further includes a control cable connected to the connecting pin for controlling the rotation of the air foil means in response to the wind against the deformable outer skin by controlling the movement of the first and second links.
9. The apparatus of claim 1 in which the pivot rod is spaced apart from the support rod means, and the pivot rod controls the rotation of the air foil means about the support rod means.
10. The apparatus of claim 9 in which the interior form is also secured to the support rod means.
11. The apparatus of claim 10 in which the support rod means includes a support rod and a link secured to the support rod, and the pivot rod is secured to the link.
12. The apparatus of claim 11 in which the support rod means further includes a control cable secured to the link for controlling the rotation of the air foil means by controlling the rotation of the link and the pivot rod.
13. The apparatus of claim 10 in which the air foil means further includes a control cable secured to the pivot rod for controlling the rotation of the air foil means by controlling the rotation of the pivot rod.

* * * * *